United States Patent [19]

Iwatsuki et al.

[11] Patent Number: 5,058,013

[45] Date of Patent: Oct. 15, 1991

[54] CONTROL OF ENGINE OUTPUT TORQUE IN COORDINATION WITH CHANGE-OVER OF SPEED STAGES OF AUTOMATIC TRANSMISSION

[75] Inventors: Kunihiro Iwatsuki; Tooru Matsubara; Hideaki Ootsubo, all of Toyota, Japan

[73] Assignee: Toyota Jidosha Kabushiki Kaisha, Toyota, Japan

[21] Appl. No.: 527,326

[22] Filed: May 23, 1990

[30] Foreign Application Priority Data

May 25, 1989 [JP] Japan .................................. 1-131986
Mar. 7, 1990 [JP] Japan .................................. 2-55993

[51] Int. Cl.$^5$ ........................................... B06K 41/06
[52] U.S. Cl. .................................. 364/424.1; 74/866
[58] Field of Search ............... 364/424.1; 74/866, 867

[56] References Cited

U.S. PATENT DOCUMENTS

| | | | |
|---|---|---|---|
| 3,674,121 | 7/1972 | Copeland | 192/52 |
| 4,266,447 | 5/1981 | Heess et al. | 74/858 |
| 4,370,903 | 2/1983 | Stroh et al. | 74/858 |
| 4,807,132 | 2/1989 | Arai et al. | 364/424.1 |
| 4,811,224 | 3/1989 | Kuerschner et al. | 364/424.1 |
| 4,819,187 | 4/1989 | Yasue et al. | 364/431.01 |
| 4,868,753 | 9/1989 | Mori | 364/424.1 |
| 4,953,090 | 8/1990 | Narita | 364/424.1 |
| 4,955,256 | 9/1990 | Kashihara et al. | 364/424.1 |

FOREIGN PATENT DOCUMENTS

| | | |
|---|---|---|
| 58-225226 | 12/1983 | Japan . |
| 59-97350 | 6/1984 | Japan . |
| 60-260749 | 12/1985 | Japan . |
| 63-43059 | 2/1988 | Japan . |

Primary Examiner—Salvatore Cangialosi
Attorney, Agent, or Firm—Oblon, Spivak, McClelland, Maier & Neustadt

[57] ABSTRACT

In the control of engine output torque for its temporary reduction for change-over of speed stages of an automatic transmission in a vehicle, recovery of the temporarily reduced engine output torque is started when a monitored rotational speed of a rotary member of the automatic transmission approaches its final value to be attained after the completion of the change-over of speed stages across a predetermined border value, and during the recovery the reduction of engine output torque is periodically adjusted in accordance with a difference between a current monitored rotational speed of the rotary member and its final due value so that a current amount of the reduction of engine output torque is decreased along with decrease of the above-mentioned difference.

8 Claims, 6 Drawing Sheets

CONTROL OF ENGINE OUTPUT TORQUE IN COORDINATION WITH CHANGE-OVER OF SPEED STAGES OF AUTOMATIC TRANSMISSION

BACKGROUND OF THE INVENTION

1. Field of the Invention

The present invention relates to a control of an engine in a vehicle equipped with an automatic transmission and, more particularly, to a control of output torque of the engine in coordination with change-over of speed stages of the automatic transmission in a manner that the output torque of the engine is temporarily reduced during the change-over of speed stages and is recovered toward the completion of the change-over of the speed stages.

2. Description of the Prior Art

It is already known to reduce output torque of the engine which drives the wheels in a vehicle via an automatic transmission temporarily during changing over of the speed stages of the transmission in order to reduce a shock which is caused by the change-over of gear trains, as proposed in British Patent 929621, German Patent or Publication 1080415, 1480177 or 1626427, French Patent 1524354, German Patent Publications 2109620, 2163979 and 2805544 acknowledged in Japanese Patent Laying-open Publication 55-46095 based upon German Patent Application P2842389. In view of the nature of abruptly reducing and recovering engine output torque according to such acknowledged various prior arts it is proposed in said Japanese Publication 55-46095 to gradually reduce and recover engine output torque for a change-over of speed stages of the automatic transmission according to a predetermined pattern of sloping down and up. On the other hand it is also known to monitor the rotational speed of a rotary member in an automatic transmission to detect a time point close to the completion of a change-over of speed stages of the automatic transmission, as described in Japanese Patent Laying-open Publication 60-260749 in which the rate of change of rotational speed of such a rotary member is monitored to detect such a time point at which the rate has decreased to a certain small limit value so as thereby to start the recovery of the temporarily reduced engine torque according to a gradually proceeding manner by taking a predetermined period.

However, it is a time point generally very close to the completion of a change-over of speed stages that the value of the rate of change of rotational speed of a rotary member in the transmission approaches zero, and such a time point is generally too late to start a gradual recovery of engine output torque temporarily reduced for a change-over of speed stages. Further, the shape of performance curve which represents the variation of rotational speed of a rotary member such as the input rotary member of the transmission which, in an upshifting from a certain first speed stage to a certain second speed stage, changes its rotational speed from a rotational speed corresponding to a multiplication of the rotational speed of the output rotary member of the transmission times a gear ratio of said certain first speed stage to a rotational speed corresponding to a multiplication of the rotational speed of the output rotary member times a gear ratio of said certain second speed stage, fluctuates substantially according to fluctuations in the operational conditions of the friction engaging means which is engaged for setting up the speed stage posterior to the changer-over of speed stages, i.e. said certain second speed stage, and therefore, when it is so adapted that the temporarily reduced engine output torque is recovered according to a predetermined time schedule in a final stage of the change-over of speed stages, the recovery of the reduced engine output torque is not satisfactorily synchronized with the completion of the change-over of speed stages, thereby inducing generation of an undesirably high shock.

SUMMARY OF THE INVENTION

Therefore, it is the object of the present invention to provide an improved method of controlling output torque of an engine in better synchronization with changer-over of speed stages of an automatic transmission in a vehicle so that the effect of temporarily reducing engine output torque for change-over of speed stages of the automatic transmission is exhibited at high efficiency.

According to the present invention, the above-mentioned object is accomplished by a method of controlling output torque of an engine in coordination with change-over of speed stages of an automatic transmission from a certain first speed stage to a certain second speed stage in a vehicle, comprising the steps of, reducing the engine output torque for said change-over of speed stages, monitoring rotational speed of at least one rotary member of said automatic transmission during progress of said change-over of speed stages so as to detect a moment at which the monitored rotational speed of said rotary member approaches a final value therefor to be attained after the completion of said change-over of speed stages across a predetermined border value, and recovering the reduced engine output torque as started from said moment so as periodically to adjust the reduction of engine output torque in accordance with a difference between a current monitored rotational speed of said rotary member and said final value therefor so that a current amount of the reduction of engine output torque is decreased along with decrease of said difference.

According to the above-mentioned method of controlling output torque of an engine in coordination with change-over of speed stages of an automatic transmission from a certain first speed stage to a certain second speed stage in a vehicle, the recovery of the engine output torque temporarily reduced for the change-over of speed stages is started at any appropriate time point preceding to the completion of the change-over of the speed stages so as to recover the reduced engine output torque at any desired gradual rate by appropriately determining the amount of said border value for the approach of the rotational speed of said rotary member to its final value to be attained after the completion of the change-over of the speed stages. Further, since according to the present invention the output torque of the engine is recovered periodically for a small amount that is gradually decreased along with decrease of the remaining difference between the current value and the final value of the rotational speed of said rotary member during the progress of change-over of speed stages, it is automatically ensured that the recovery of the reduced output torque of the engine is just completed at the same time as the change-over of the speed stages is completed.

In the above-mentioned method the reduction of engine output torque may be periodically recovered so that a current amount of the reduction of engine output torque is proportional to a current difference between a current monitored rotational speed of said rotary member and said final value therefor.

Or, alternatively, the reduction of engine output torque may be periodically recovered so that a current amount of the reduction of engine output torque is proportional to square root of a current difference between a current monitored rotational speed of said rotary member and said final value therefor.

Further, in the above-mentioned method, said rotary member may be an input rotary member of said automatic transmission, rotational speed of an output rotary member of said automatic transmission may also be monitored, and the reduction of engine output torque may be adjusted in said periodical recovery thereof in accordance with a difference between a current monitored rotational speed of said input rotary member and a multiplication of the monitored rotational speed of said output rotary member times a gear ratio of said certain second speed stage so that a current amount of the reduction of engine output torque is decreased along with decrease of said difference between a current monitored rotational speed of said input rotary member and a multiplication of the monitored rotational speed of said output rotary member times a gear ratio of said certain second speed stage.

Further, in the above-mentioned method, said rotary member may be an inner race of a brake of said automatic transmission adapted to be disengaged for setting up said certain first speed stage and engaged for setting up said certain second speed stage, and the reduction of engine output may be adjusted in said periodical recovery thereof in accordance with a current monitored rotational speed of said inner race so that a current amount of the reduction of engine output torque is decreased along with decrease of said current monitored rotational speed of said inner race.

Further, in the above-mentioned method, said certain second speed stage may be set up by engagement of a certain friction engaging means actuated by a hydraulic pressure and a pressure value of said hydraulic pressured supplied to said certain friction engaging means may be gradually reduced starting from said moment and returned to a certain initial value after the completion of the change-over of speed stages. In this case, when the reduction of engine output torque is periodically recovered so that a current amount of the reduction of engine output torque is proportional to square root of a current difference between a current monitored rotational speed of said rotary member and said final value therefor, the pressure value of said hydraulic pressured supplied to said certain friction engaging means may be linearly reduced relative to the lapse of time starting from said moment and returned to a certain initial value after the completion of the change-over of speed stages.

In the above-mentioned method, the start of recovering the reduced engine output torque may be delayed relative to the start of reducing the pressure value of said hydraulic pressure for a time lapse to compensate for a difference in quickness of response in the reduction of the pressure value of said hydraulic pressure and the recovery of the reduced engine output torque.

BRIEF DESCRIPTION OF THE DRAWINGS

In the accompanying drawings.

DESCRIPTION OF THE PREFERRED EMBODIMENTS

In the following the present invention will be described in more detail with respect to some preferred embodiments with reference to the accompanying drawings.

Figure 1:
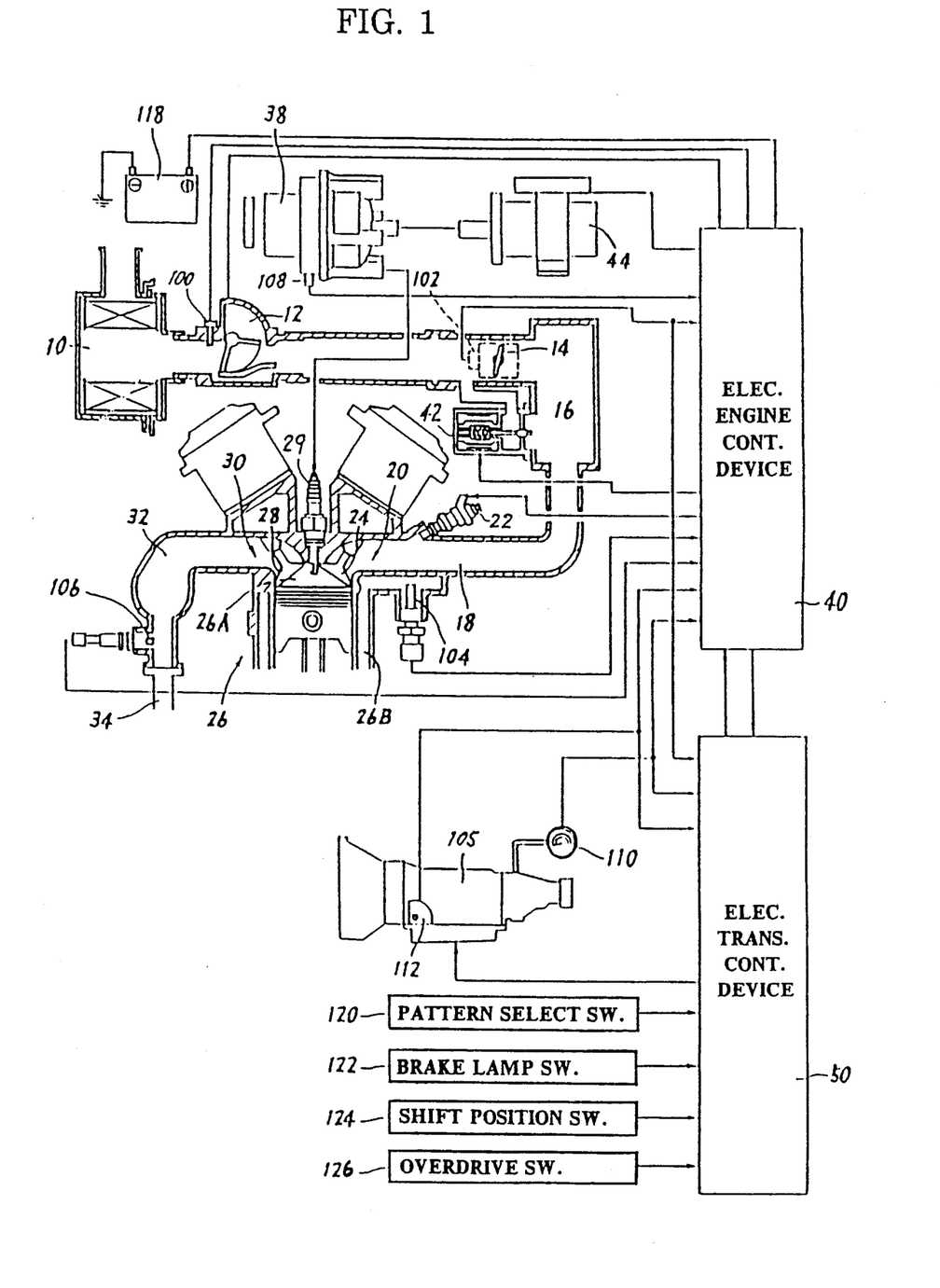
FIG. 1 is a partly sectional and partly diagrammatic illustration of a combination of an internal combustion engine and an automatic transmission with electronic control devices for the engine and the automatic transmission in a vehicle.

Referring to FIG. 1, the internal combustion engine herein shown which may be controlled according to the method of the present invention in relation to a control of the automatic transmission also herein shown comprises a cylinder-piston assembly 26 having a combustion chamber 26A adapted to be supplied with an intake fuel-air mixture from an intake port 20 provided with an intake valve 24, said intake fuel-air mixture being generated from intake air supplied through an intake system including an air cleaner 10, an air flow meter 12, a throttle valve 14, a surge tank 16, an idle controlling valve 42 for controlling an idling air passage bypassing the throttle valve 14, and an intake manifold 18 and fuel injected from a fuel injection valve 22 toward the intake port 20, and to exhaust combustion gases generated by the combustion of the fuel-air mixture through an exhaust port 30 provided with an exhaust valve 28 toward an exhaust system including an exhaust manifold 32 and an exhaust pipe 34. The combustion of the fuel-air mixture in the combustion chamber 26A is triggered by a spark plug 29 which is energized by an electric current supplied from an ignition coil 44 through a distributor 38. The temperature of the intake air is detected by an intake air temperature sensor 100, the temperature of engine cooling water in a water jacket 26B of the engine is detected by a cooling water temperature sensor 104, the oxygen content of the exhaust gases is detected by an oxygen sensor 106, the opening degree of the throttle valve 14 is detected by a throttle opening sensor 102, and the crank angle is detected by a crank angle sensor 108. The data obtained by these sensors are all supplied to an electronic engine control device 40 which calculates engine control parameters based upon the data received from these sensors and dispatches control signals to the ignition coil 44, the fuel injecting nozzle 22 and the idle control valve 42.

An automatic transmission designated by 105 which may be of any conventional type is in fact mechanically connected with the engine having the cylinder-piston assembly 26 and is adapted to provide various speed stages under the control by an electronic transmission control device 50 which calculates transmission control parameters based upon data such as input rotational speed of an input rotational member of the transmission detected by a turbine speed sensor 112, output rotational speed of an output rotational member of the transmission which corresponds to vehicle speed and is therefore detected by a vehicle speed sensor 110, selection with regard to a plurality of shift patterns such as a power preference shift pattern an economy preference shift pattern from a pattern select switch 120, stepping on and off of the brake from a brake lamp switch 122, shift position of shift position selection lever from a shift position switch 124, and on and off of the overdrive stage from an overdrive switch 124. The signals from the vehicle speed sensor 110 and the turbine speed sensor 112 are also supplied to the electronic engine control device 40 which is interconnected with the electronic transmission control device 50. Although the electronic engine control device 40 and the electronic transmission control device 50 are separated in the diagrammatic illustration in FIG. 1 for the convenience of separating control concepts for the engine and the transmission, these two electronic control devices may be in fact a single electronic computing unit. These electronic control devices are energized by a battery 118.

The automatic transmission 105 may comprise a gear train made of a combination of a planetary gear type overdrive gear unit and a planetary gear type underdrive gear unit to provide a plurality of speed stages of different reduction gear ratios according to selective engagement and disengagement of a plurality of friction engaging means such as clutches and brakes. Such a gear train is well known in the art. In such a gear train a certain change-over of speed stages from a certain first speed stage to a certain second speed stage is accomplished by a brake incorporated in the planetary gear type overdrive gear unit is changed over from its disengaged condition to its engaged condition. In such a case the rotational speed of an inner race member of the brake may be monitored to detect the progress of change-over of speed stages as described in detail hereinunder by a rotational speed sensor similar to the turbine speed sensor 112.

Figure 2:
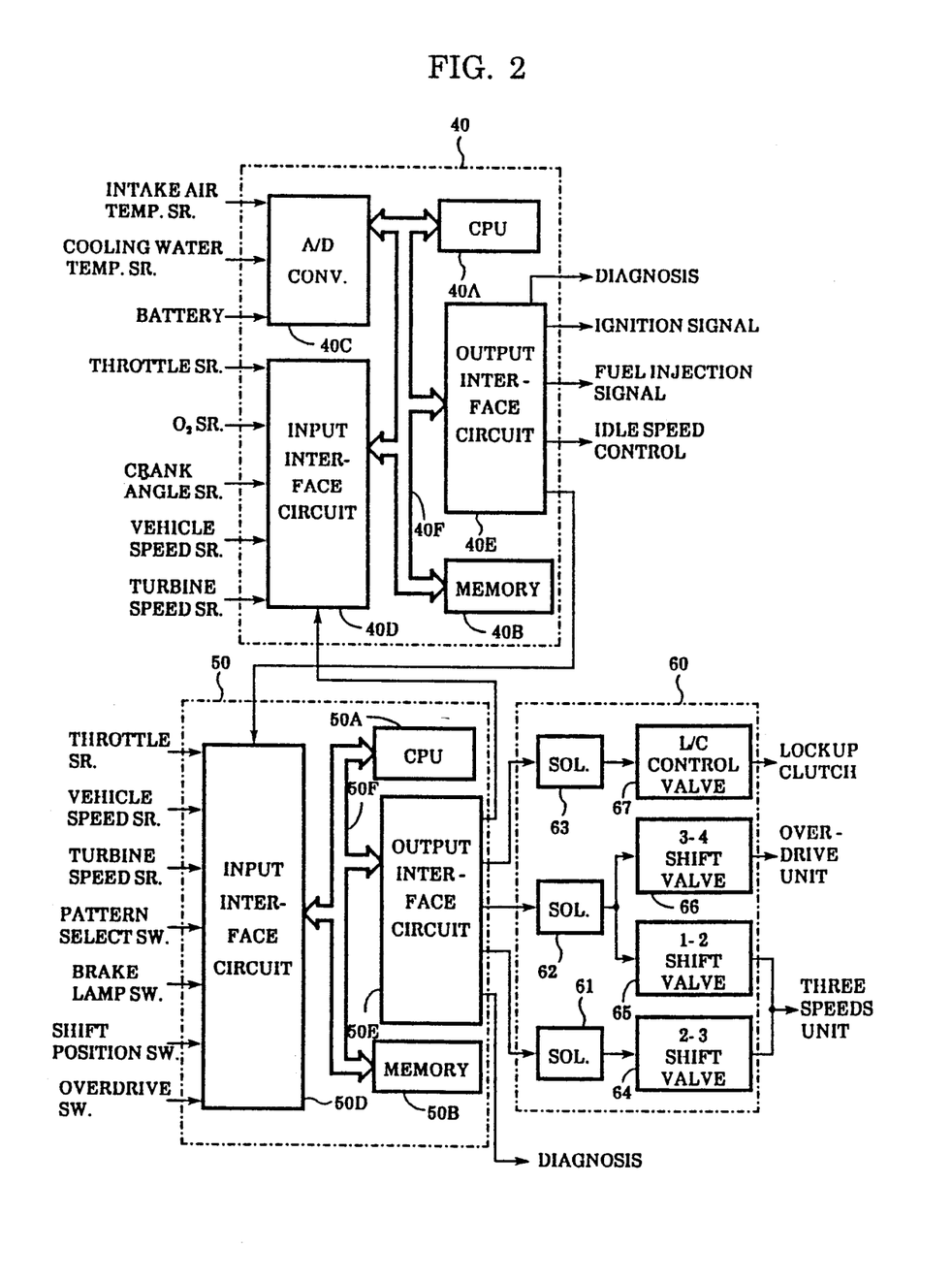
FIG. 2 is a diagrammatic illustration of the constructions of the electronic engine control device and the electronic transmission control device shown in FIG. 1.

The electronic engine control device 40 and the electronic transmission control device 50 are provided by an electronic computing system such as diagrammatically illustrated in FIG. 2. The electronic engine control device 40 includes a central processing unit 40A, a memory 40B including well known ROM and RAM, an analog-digital converter 40C, an input interface circuit 40D, an output interface circuit 40E and a common bus 40F interconnecting these functional units. The electronic engine control device 40 is supplied with inputs from the intake air temperature sensor 100, the cooling water temperature sensor 104 and the battery 118 shown in FIG. 1 through the analog-digital converter 40C and inputs from the throttle sensor 102, the oxygen sensor 106, the crank angle sensor 108, the vehicle speed sensor 110 and the turbine speed sensor 112 through the input interface circuit 40D, calculates engine control parameters in the central processing units 40A based upon these data and certain data and programs stored in the memory 40B, and outputs through the output interface circuit 40E control signals such as an ignition signal for controlling the spark timing by the spark plug 29, a fuel injection signal for controlling fuel injection by the fuel injection valve 22, and an idle speed control signal for controlling the idle control valve 42 as well as a diagnosis signal for the purpose of diagnosis.

Similarly, the electronic transmission control device 50 includes a central processing unit 50A, a memory 50B including ROM and RAM, an input interface circuit 50D, an output interface circuit 50E and a common bus 50F interconnecting these functional units. The electronic transmission control unit 50 also receives data from the throttle sensor 102, the vehicle speed sensor 110, the turbine speed sensor 112, the pattern select switch 120, the brake lamp switch 122, the shift position switch 124 and the overdrive switch 126 through the input interface circuit 50D, calculates transmission control parameters in the central processing unit 50A based upon these data and certain data and programs stored in the memory 50B, and outputs control signals toward an electronic-hydraulic control circuit 60 including solenoid valves 61, 62 and 63, a 2-3 shift valve 64 adapted to be switched over according to on and off of the solenoid valve 61, a 1-2 shift valve 65 and a 3-4 shift valve 66 both being adapted to be switched over according to on and off of the solenoid valve 62, and a lockup control valve 67 adapted to be switched over according to on and off of the solenoid valve 63. An electric-hydraulic control circuit of this type is shown in, for example, U.S. patent application Ser. No. 07/388,485.

The operation for the control of output torque of the engine performed by the electronic engine control device 40 will be explained in the form of a flowchart with reference to FIG. 3. The control process according to the flowchart shown in FIG. 3 is repetitively carried out at a predetermined small time interval of the order of several micro seconds as well known in this art.

Figure 3:
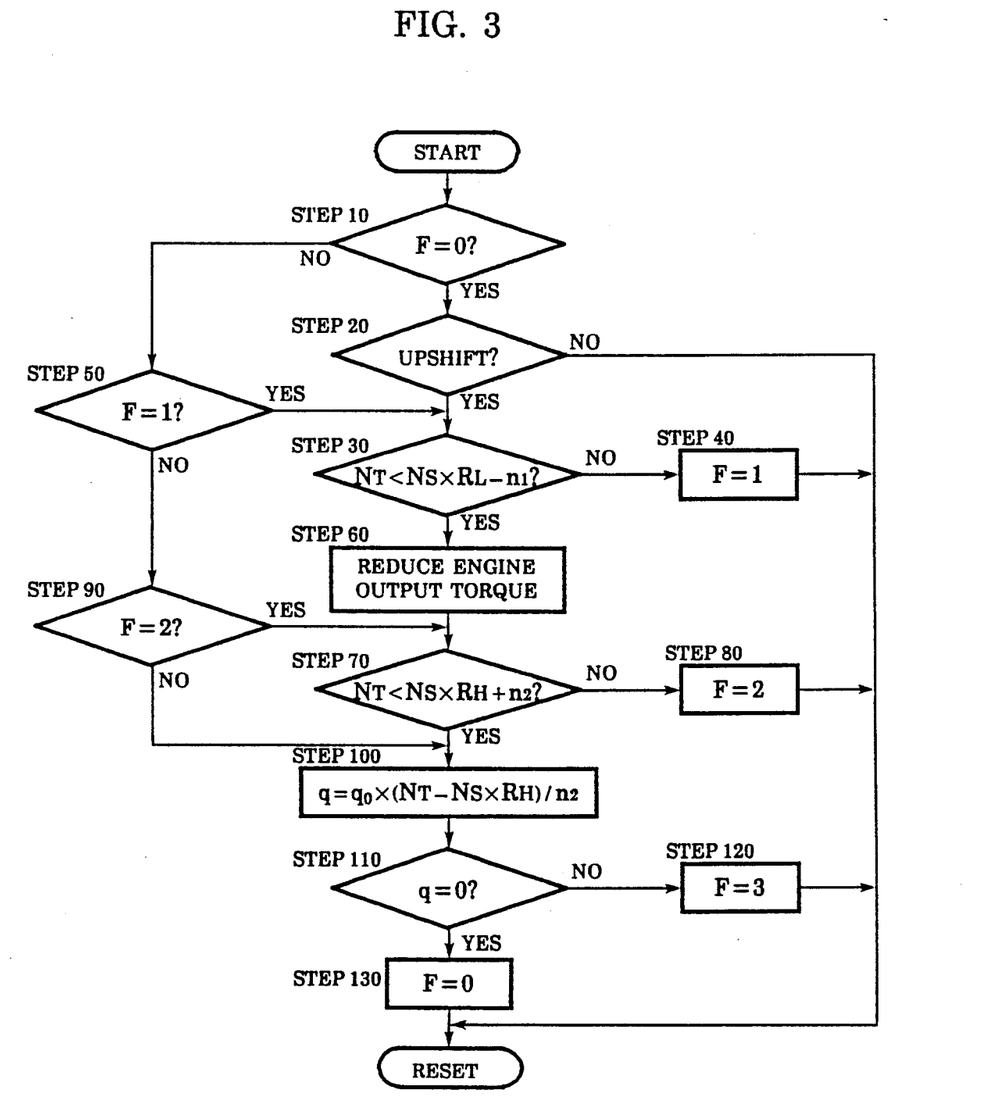
FIG. 3 is a flowchart showing a basic concept of controlling output torque of an engine in coordination with change-over of speed stages of an automatic transmission according to the present invention.

When the control according to the flowchart shown in FIG. 3 is started, in step 10 it is checked if a flag F is equal to 0 or not. Each time when the engine is newly started the flag F is reset to 0. Therefore, when the control according to the flowchart shown in FIG. 3 is first carried out after the new start of the engine, at step 10 the answer is yes, and accordingly the process proceeds to step 20.

In step 20 it is checked if the transmission is under a certain upshift control. It is only an embodiment that the change-over of speed stages herein concerned is an upshift. If the answer is no, the process proceeds directly to the end of the routine according to the flowchart toward RESET. If, however, the automatic transmission is under a certain upshift control, the process proceeds to step 30, and it is checked if the rotational speed NT of an input rotary member, such as the turbine in the torque converter in the automatic transmission according to an embodiment, monitored by the turbine speed sensor 112, is smaller than a multiplication of the rotational speed NS of an output rotational member of the transmission monitored by the vehicle speed sensor 110 times a gear ratio RL of a certain first speed stage from which the transmission is going to be changed over to a certain second speed stage across a certain difference $n_1$. If the answer in the checking process in step 30 is no, the process proceeds to step 40, the flag F is set to 1, and then this control routine is once finished. After the start of the upshifting from said certain first speed stage to said certain second speed stage detectable in step 20, until a certain time lapses, the answer in the checking process in step 30 will remain no, and therefore in several subsequent control routines through the flowchart shown in FIG. 3, the answer in step 10 will be no, and the process will proceed to step 50 where it is checked if the flag F is 1, and since the flag F is now 1, the process will proceed to step 30.

When the changing-over of the speed stages from said certain first speed stage to said certain second speed stage proceeds substantially so that a friction engaging means to set up said certain second speed stage begins to engage, the rotational speed NT decreases from its initial value more than the certain small amount $n_1$, and therefore the answer of the checking process in step 30 changes from no to yes, and then the process proceeds to step 60, and here a control is performed by the electronic engine device 40 to decrease engine output power from Ta to Tb. It may be done by any known art to decrease engine output torque, including a delay of ignition timing, a reduction of amount of fuel injection, or a reduction of intake air supply to the engine cylinders. Then the process proceeds to step 70.

In step 70, it is checked if the input rotational speed NT is smaller than an addition of a multiplication of the output rotational speed NS times a gear ratio RH of said certain second speed stage plus a predetermined border value $n_2$. Here the value of $n_2$ is selected to obtain a time point prior to the completion of the change-over of the speed stages by a time duration enough to accomplish a desired gradual recovery of engine output torque, as described in more detail hereinunder with reference to the graph of FIG. 4. Here the answer of the checking process in step 70 will also be no for the time being. In the first control process through step 70, the process will proceed to step 80 and the flag F is set to 2 so that in some subsequent control routines according to the flowchart shown in FIG. 3 the process proceeds through steps 50 and 90 to reach step 70 while bypassing steps, 20, 30 and 60.

When the change-over of speed stages from said certain first speed stage to said certain second speed stage has proceeded so much as to approach its completion with the input rotational speed NT approaching its final rotational speed posterior to the completion of the speed stage shifting corresponding to $NS \times RH$ within the difference $n_2$, the answer in the checking process in step 70 turns from no to yes, and then the process proceeds to step 100.

In step 100 the output torque of the engine is so controlled that the amount of its temporal reduction q is recovered to a multiplication of a value $q_0$ of the engine torque reduction at the start of recovery, i.e. at the time point of first reaching step 100 and a ratio of a difference between a current value of the input rotational speed NT and a multiplication of the output rotational speed NS times the gear ratio RH of said certain second speed stage to the border value $n_2$ for the approach of the input rotation speed NT to its final value in said certain second speed stage. Then the process proceeds to step 110 and it is checked if q has decreased to 0 or not. If the answer is no, the process proceeds to step 120, then the flag F is set to 3, and then the control routine is once finished, so that in the next control process the process reaches step 100 through steps 50 and 90 while bypassing steps 20, 30, 60 and 70.

As the input rotational speed NT approaches its final value, i.e. $NS \times RH$, toward the completion of the change-over of the speed stages, the amount of the temporary reduction of engine output torque, i.e. q, approaches 0 in coordination with the gradual decrease of the value $(NT - NS \times RH)/n_2$, and at the completion of the change-over of the speed stages, that is, when NT has come to be equal to $NS \times RH$, the answer in the checking process in step 110 turns from no to yes, and then the process proceeds to step 130, where the flag F is set to 0, and series of control processes by the flowchart shown in FIG. 3 are completed.

Figure 4:
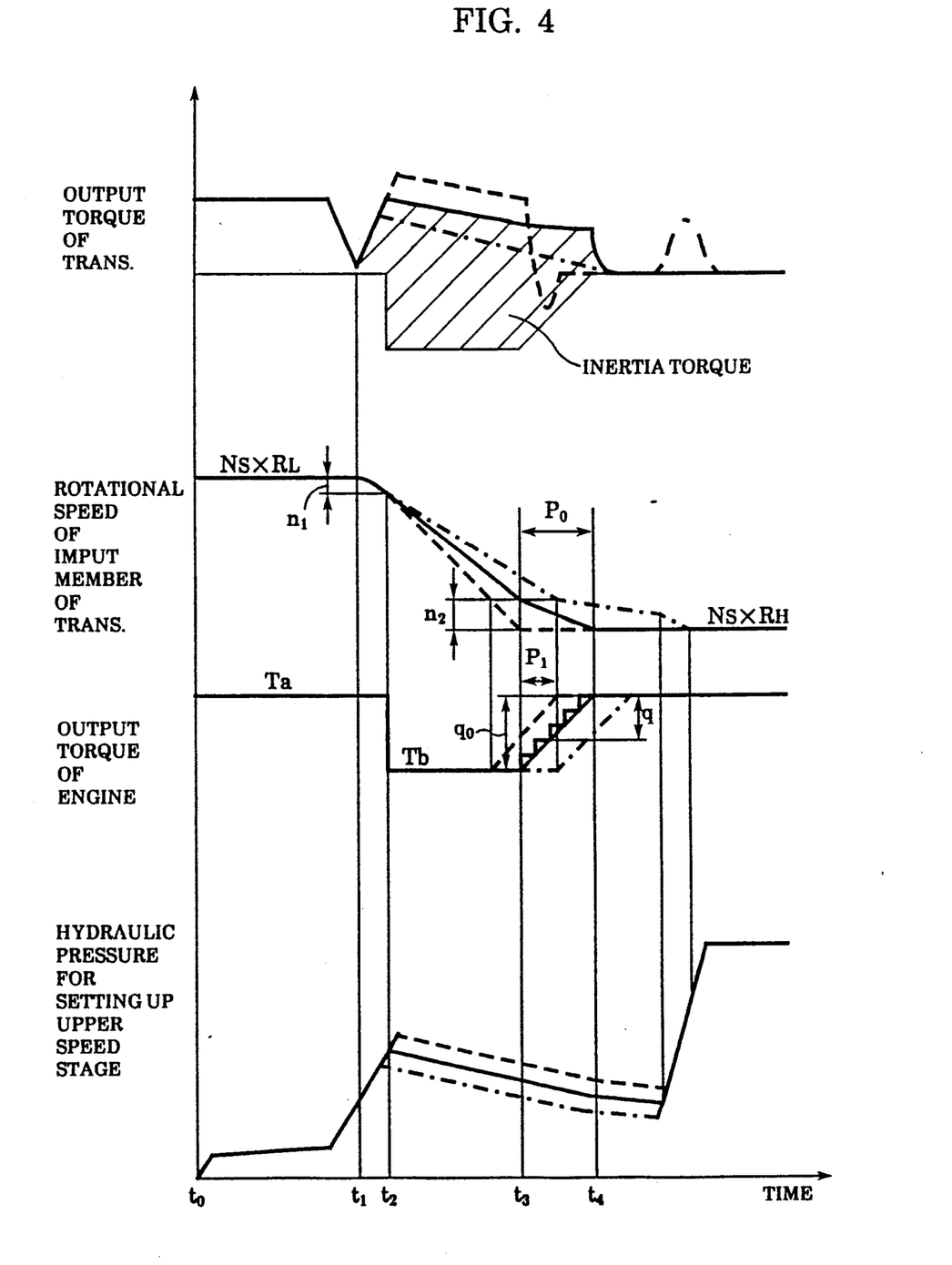
FIG. 4 is a graph showing changes of various variable amounts relative to a common abscissa for the lapse of time according to the control operations following the flowchart of FIG. 3.

In FIG. 4 variations of the output torque of the automatic transmission, the input rotational speed NT of the automatic transmission, the output torque of the engine and the pressure value of the hydraulic pressure supplied to a certain friction engaging means which is engaged to set up said certain second speed stage are shown relative to a common abscissa for the lapse of time. In FIG. 4 the solid line for each variable amount shows a standard operating condition. In such a standard operating condition, when the electronic transmission control device 50 has started the upshifting from said certain first speed stage to said certain second speed stage at time point $t_0$, it starts to supply the hydraulic pressure to said certain friction engaging means to set up said certain second speed stage, so that the pressure value in the hydraulic actuator for said certain friction engaging means increases as shown in the lowest part of the graph in FIG. 4. After the pressure value of the hydraulic pressure has reached a certain value which provides a substantial engagement of the friction engaging means at time point $t_1$, the input rotational speed NT starts to decrease, and when the input rotational speed NT has decreased from its starting value, i.e. the multiplication of the output rotational speed NS times the gear ration RL of said certain first speed stage across the value $n_1$, at time point $t_2$ the engine output torque is reduced from Ta to Tb. Then as the pressure value of the hydraulic pressure changes as shown in the graph with the lapse of time, the input rotational speed NT decreases gradually as shown in the graph.

When the input rotational speed NT has approached its final value to be attained after the completion of the change-over of speed stages from said certain first speed stage to said certain second speed stage, i.e. $NS \times RH$ across said border value $n_2$ at time point $t_3$, the recover of the temporary reduction of engine output torque is started. The magnitude of the temporary reduction of engine output torque and the magnitude of the border value $n_2$ may be determined according to each particular design of the engine and the automatic transmission so as to accomplish an optimum effect of reducing the shock due to change-over of speed stages of the automatic transmission. An example of a set of values for the temporary engine torque reduction Ta−Tb which may be equal to $q_0$ and the border value $n_2$ are given in Table 1. In this example the amount of the temporary engine torque reduction and the amount of said border value are changed to increase generally in accordance with engine load or throttle opening. In the shown example those values are also varied in accordance with the kind of upshifting depending upon a particular design of the transmission gear mechanism.

Starting from the time point $t_3$ the engine output torque is recovered so that the amount of the temporary engine torque reduction is reduced from its value $q_0$ at time point $t_3$ gradually in coordination with the approaching of the input rotational speed NT to its final value $NS \times RH$ as described with reference to step 100 in the flowchart shown in FIG. 3. Since this gradual recovery of engine output torque is carried out at a certain time interval corresponding to the frequency of repetition of the control operation according to the flowchart shown in FIG. 3, the engine output torque is in fact recovered steppedly as shown in the graph of FIG. 4. As the engine output torque is gradually increased by the recovery of the temporary engine torque reduction, the rate of reduction of the input rotational speed NT is somewhat attenuated as shown in the graph of FIG. 4. However, since the recovery of the engine output torque is always coordinated with the degree of approach of the input rotational speed NT to its final value $NS \times RH$, it is always ensured that the recovery of the engine output torque from its temporary reduction is completed at the same time as the change-over of the speed stages is completed so that the input rotational speed NT reaches its final value $NS \times RH$ at time point $t_4$ with the complete recovery of the engine output torque at the same time. According to such a temporary reduction of engine output torque and such a recovery of engine output torque coordinated with the final stage of completion of change over of speed stages the output torque of the transmission changes smoothly as shown by the solid line in the upper most portion of the graph in FIG. 4.

If the gradual recovery of the engine output torque is controlled so as to be accomplished with the lapse of a predetermined time PO as in the conventional art, when the pressure value of the hydraulic pressure supplied to the friction engaging means is higher than the standard operating condition as shown by a broken line in the graph of FIG. 4, the input rotational speed NT of the transmission will decrease more rapidly as shown by a broken line in the corresponding portion of the graph in FIG. 4 so that the recovery of the engine output torque delays as much as a period P1 from the completion of the change-over of speed stages. Therefore, the output torque of the automatic transmission varies as shown by a broken line in the corresponding part of the graph in FIG. 4, causing an abrupt fall of output torque just after the completion of the change over of the speed stages. On the contrary, if the pressure value of the hydraulic pressure supplied to the friction engaging means is lower than the standard value as shown by a dot-dash line in the corresponding part of the graph in FIG. 4, the input rotational speed NT decreases more slowly, and therefore if the recovery of the engine output torque is carried out in the same period PO, the engine output torque is fully recovered before the friction engaging means comes to its substantial final engagement so that the input rotational speed NT reaches it final rotational speed $NS \times RH$, thereby losing the substantial effects of temporarily reducing the engine output torque. Therefore there occurs an abrupt rise of the output torque as shown in the corresponding part of the graph in FIG. 4 when the friction engaging means comes to its final engagement and the input rotational speed NT comes to its final rotational speed $NS \times RH$.

Figure 5:
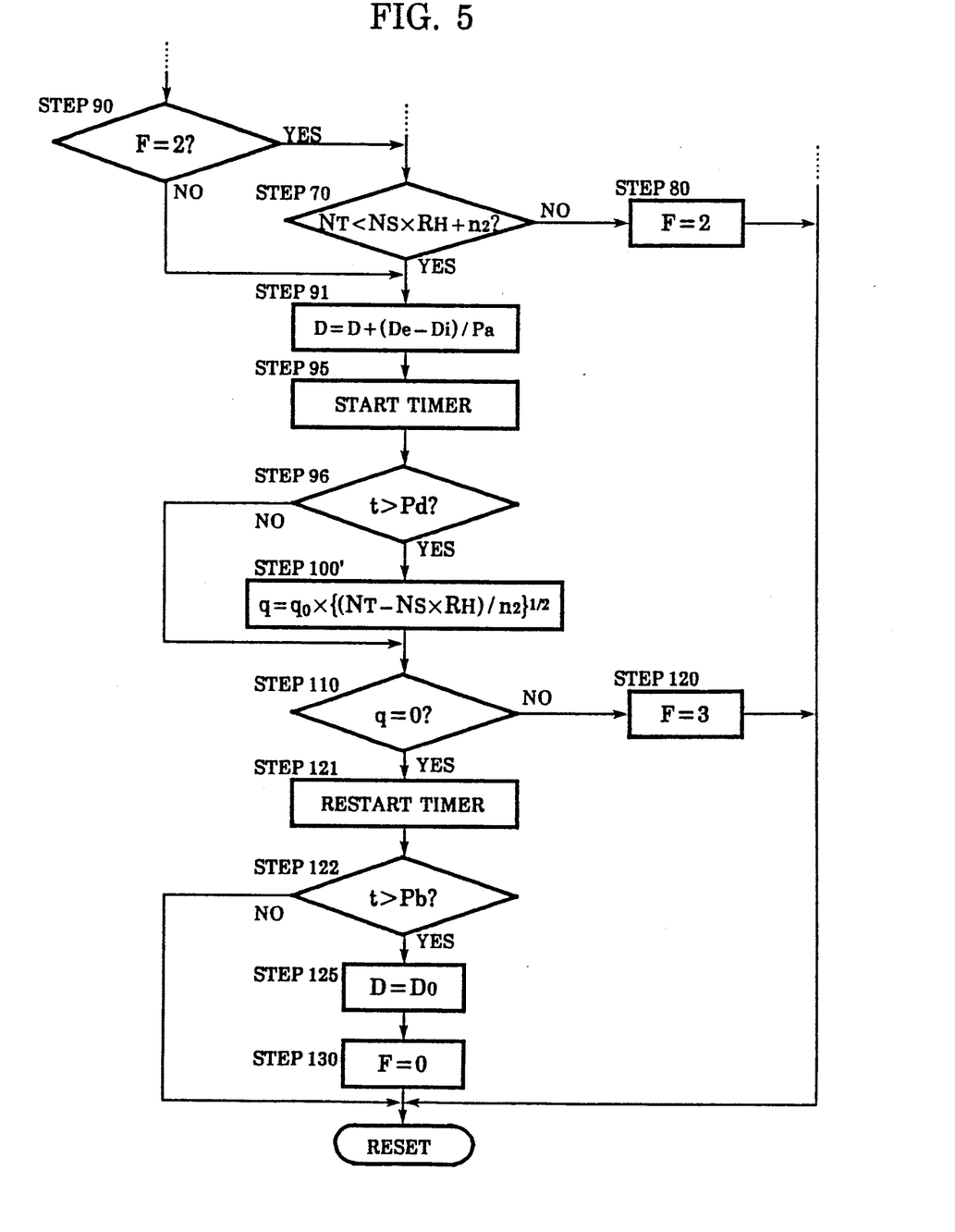
FIG. 5 is a partial flowchart showing a modification to a part of the processes in the flowchart shown in FIG. 3.

FIG. 5 is a partial flowchart showing a series of several steps to be performed as a modification of the control process according to the flowchart shown in FIG. 3. In FIG. 5 the steps bearing the same step numbers as those in FIG. 3 correspond to those steps in FIG. 3. Therefore, in fact the steps 91, 95, 96, 121, 122 and 125 are the new steps provided in addition to the steps in the flowchart shown in FIG. 3, and step 100' is a modification corresponding to step 100 in the flowchart shown in FIG. 3. According to this modification, when the input rotational speed NT has approached its final rotational speed $NS \times RH$ across the bounder value $n_2$, then in step 91 the pressure value of the hydraulic pressure supplied to the actuator for said certain friction engaging means is reduced. The pressure value of the hydraulic pressure supplied to the actuator of said certain friction engaging means is controlled by the electro-hydraulic control circuit 60 under the control instructions dispatched from the electronic transmission control device 50. The electro-hydraulic control circuit 60 is already known in this art as described in, for example, the above-mentioned U.S. patent application Ser. No. 07/388,485 and includes a hydraulic pressure regulation valve which regulates the pressure value of a back pressure of some hydraulic accumulators for the friction engaging means in accordance with the duty ratio of an electric control signal supplied thereto so as thereby to modify the pressure value of the hydraulic pressure supplied to the friction engaging means. Therefore, in step 91, according to this embodiment, the control to reduce the pressure value of the hydraulic pressure is expressed in the form on control of the duty ratio of the electric control signal supplied to the pressure regulation valve. Thus, each time when the control process proceeds through step 91 the duty ratio D is increased by an increment $(De - Di)/Pa$, wherein Di is the value of the duty ratio D at the start of control of the duty ratio, De is the value of the duty ratio to which the duty ratio is to be increased by the duty ratio control to reduce the pressure value of the hydraulic pressure supplied to said certain friction engaging means to set up said certain second speed stage, and Pa is a period during which the duty ratio is to be gradually increased from Di to De. The time duration Pa is estimated to correspond approximately to the period PO in the graph shown in FIG. 4.

Further, in the modification according to the flowchart shown in FIG. 5, subsequent to step 91, in step 95 a timer is started, and in step 96 it is checked if the time count t by the timer has exceeded a certain predetermined short period Pd which is determined to compensate for a difference in quickness of response in the reduction of the pressure value of the hydraulic pressure according to the step 91 and the recovery of engine output torque according to a process such as step 100 in the flowchart shown in FIG. 3 or the corresponding step 100' in this modification. Therefore, until the period Pd lapses after the start of the duty ratio control in step 91 the control process bypasses step 100' which corresponds to and is a modification of step 100 in the flowchart shown in FIG. 3.

in step 100' the engine output torque is recovered so that the amount of the reduction of engine output torque q is recovered to a multiplication of the amount of reduction of engine output torque at the time point $t_3$ times a square root of the ratio of a difference between a current value of the input rotational speed NT and a multiplication of the output rotational speed NS times the gear ratio RH of said certain second speed stage to said border value $n_2$. The use of such a square root value is based upon an idea that it is more desirable that the decrease of the input rotational speed NT is gradually moderated as it approaches its final value so that the performance curve of the input rotational speed NT turns to be convex toward down as shown in FIG. 6, while such a performance characteristic is available when the pressure value of the hydraulic pressure supplied to the friction engaging means to set up said certain second speed stage is reduced toward the completion of the change-over of speed stages by a process such as step 91, and when the amount q of the reduction of engine output torque is coordinated with such a square root of the difference of the input rotational speed NT from its final value NS×RH, the performance curve of the amount q of the reduction of engine output torque will become substantially straight so that the recovery of the engine output torque is substantially linearly carried out.

After the completion of the change-over of the speed stages has been confirmed in step 110, the control process proceeds to step 121 and the timer is restarted to count a period Pb. When it has been checked that the period Pb has lapsed from the completion of the change-over of the speed stages, the control process proceeds to step 125 and the duty ratio D is returned to a certain initial value D0.

Figure 6:
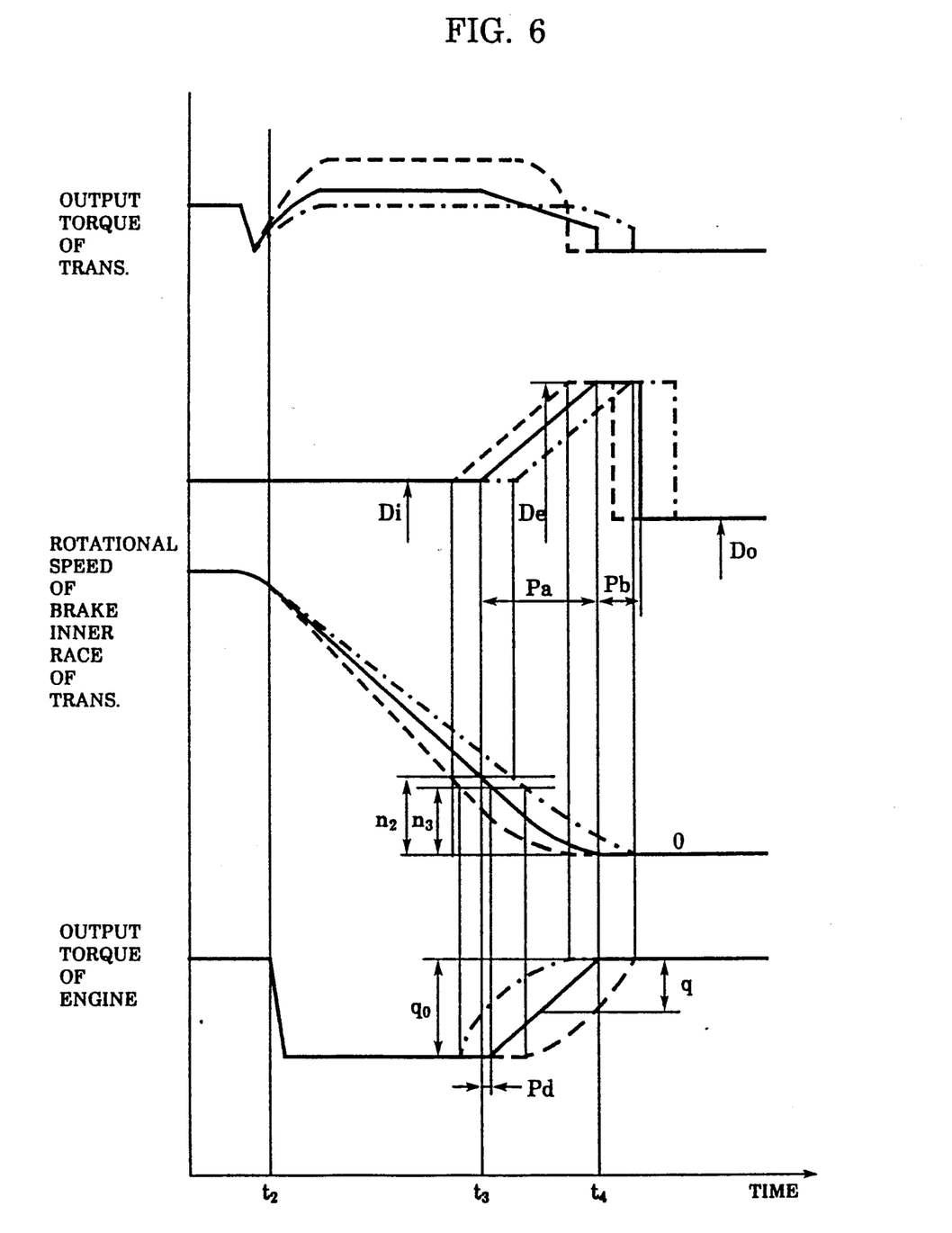
FIG. 6 is a graph showing changes of various variable amounts relative to a common abscissa for the lapse of time according to the modification shown in FIG. 5.

FIG. 6 shows variations of the output torque of the transmission, the duty ratio D representing the pressure value of the hydraulic pressure supplied to the friction engaging means to set up said certain second speed stage, the rotational speed of a rotational member to be monitored, and the output torque of the engine available by the control modified according to the steps shown in FIG. 5 relative to a common abscissa for the lapse of time. When the rotary member the rotational speed of which is monitored is a member such as the above-mentioned inner race of a brake in the planetary gear type overdrive unit that is braked toward the completion of the change-over of the speed stages from a certain speed stage to a certain second speed stage herein concerned, RH in steps 70 and 100' may conveniently be zero, and, as shown in FIG. 6, the rotational speed of the inner race may be monitored toward zero, i.e. stoppage.

In FIG. 6, the broken lines and the dot-dash lines show certain fluctuations of the operating condition on opposite sides of the standard operating condition shown by the solid lines. Here it is to be confirmed that the broken line and the dot-dash line for the performance of output torque of the transmission in FIG. 4 show the certain fluctuations according to the conventional art, whereas all broken lines and dot-dash lines in FIG. 6 show the fluctuations of operation according to the present invention. As noted from these performance curves, there is a self converging characteristic in this modified control operation as compared with the basic control operation according to the flowchart shown in FIG. 3 so that even when certain fluctuations have occurred in the time point of starting the recovery of the reduction of engine output torque according certain fluctuations in the decreasing performance of the input rotational speed NT, the difference in the time point of completing the change-over of speed stages due to such fluctuations is automatically reduced.

As shown in FIG. 6, the delay time Pd for compensating for the difference in quickness in response of the control of the hydraulic pressure and the engine output torque may be replaced by a third check of the approach of the rotational speed of the rotary member to zero across a third border value n3.

Although the invention has been described with respect to some preferred embodiments thereof, it will be understood by those skilled in the art that various modifications are possible with respect to the shown embodiments without departing from the sprit of the invention.

TABLE 1

| ENGINE LOAD (throttle opening (%)) | CHANGE-OVER OF SPEED STAGES | | | | | |
|---|---|---|---|---|---|---|
| | 1→2 | | 2→3 | | 3→4 | |
| | DELAY OF IGNITION (degree) | ROTATION SPEED (rpm) | DELAY OF IGNITION (degree) | ROTATION SPEED (rpm) | DELAY OF IGNITION (degree) | ROTATION SPEED (rpm) |
| 0 ~ 7 | 0 | 0 | 0 | 0 | 0 | 0 |
| 0 ~ 15 | 0 | 0 | 0 | 0 | 0 | 0 |
| 15 ~ 25 | 10 | 300 | 10 | 300 | 8 | 300 |
| 25 ~ 35 | 15 | 350 | 10 | 400 | 10 | 400 |
| 35 ~ 50 | 20 | 400 | 15 | 600 | 13 | 500 |
| 50 ~ 65 | 25 | 450 | 20 | 800 | 20 | 600 |
| 65 ~ 85 | 25 | 500 | 25 | 1000 | 20 | 700 |
| 85 ~ 100 | 25 | 600 | 25 | 1100 | 20 | 800 |

We claim:

1. A method of controlling output torque of an engine in coordination with change-over of speed stages of an automatic transmission from a certain first speed stage to a certain second speed stage in a vehicle, comprising the steps of:
reducing the engine output torque for said change-over of speed stages,
monitoring a rotational speed of at least one rotary member of said automatic transmission during progress of said change-over of speed stages to detect a moment at which the monitored rotational speed of said rotary member crosses a predetermined value of said rotational speed of said at least one rotary member and approaches a final value therefor which is attained after the completion of said change-over of speed stages, wherein the predetermined value differs from said final value, and
initiating a step of recovering the reduced engine output torque during a time beginning at said moment, said recovering step comprising periodically adjusting the reduction of engine output torque in accordance with a difference between a current monitored rotational speed of said rotary member and said final value therefor such that a current amount of the reduction of engine output torque is decreased in correspondence with a decrease of said difference.

2. The method according to claim 1, wherein the step of recovering the reduced engine output torque is periodically performed such that a current amount of the reduction of engine output torque is proportional to a current difference between a current monitored rotational speed of said rotary member and said final value therefor.

3. The method according to claim 1, wherein the step of recovering the reduced engine output torque is periodically performed such that a current amount of the reduction of engine output torque is proportional to a square root of a current difference between a current monitored rotational speed of said rotary member and said final value therefor.

4. The method according to claim 1, wherein said rotary member is an input rotary member of said automatic transmission, a rotational speed of an output rotary member of said automatic transmission is also monitored, and the reduction of engine output torque is adjusted in said recovery step in accordance with a difference between a current monitored rotational speed of said input rotary member and a multiplication of the monitored rotational speed of said output rotary member times a gear ratio of said certain second speed stage so that a current amount of the reduction of engine output torque is decreased along with decrease of said difference between a current monitored rotational speed of said input rotary member and a multiplication of the monitored rotational speed of said output rotary member times a gear ratio of said certain second speed stage.

5. The method according to claim 1, wherein said rotary member is an inner race of a brake of said automatic transmission adapted to be disengaged for setting up said certain first speed stage and engaged for setting up said certain second speed stage, and the reduction of engine output torque is adjusted in said recovery step thereof in accordance with a current monitored rotational speed of said inner race so that a current amount of the reduction of engine output torque is decreased along with decrease of said current monitored rotational speed of said inner race.

6. The method according to claim 1, wherein said certain second speed stage is set up by engagement of a certain friction engaging means actuated by a hydraulic pressure and a pressure value of said hydraulic pressured supplied to said certain friction engaging means is gradually reduced starting from said moment and returned to a certain initial value after the completion of the change-over of speed stages.

7. The method according to claim 3, wherein said certain second speed stage is set up by engagement of a certain friction engaging means actuated by a hydraulic pressure and a pressure value of said hydraulic pressured supplied to said certain friction engaging means is linearly reduced relative to the lapse of time starting from said moment and returned to a certain initial value after the completion of the change-over of speed stages.

8. The method according to claim 6, wherein the start of recovering the reduced engine output torque is delayed relative to the start of reducing the pressure value of said hydraulic pressure for a time lapse to compensate for a difference in quickness of response in the reduction of the pressure value of said hydraulic pressure and the recovery of the reduced engine output torque.

* * * * *